US010955863B2

(12) United States Patent
Neic et al.

(10) Patent No.: US 10,955,863 B2
(45) Date of Patent: Mar. 23, 2021

(54) CIRCUIT APPARATUS FOR CONTROLLING A GLAZING UNIT WHOSE TRANSPARENCY IS SWITCHABLE, AND SWITCHABLE GLAZING ASSEMBLY, MOTOR VEHICLE AND METHOD FOR CONTROLLING A GLAZING UNIT WHOSE TRANSPARENCY IS SWITCHABLE

(71) Applicant: Continental Automotive GmbH, Hannover (DE)

(72) Inventors: Aurel-Vasile Neic, Kasten bei Boeheimkirchen (AT); Wolfgang Koellner, Vienna (AT)

(73) Assignee: Continental Automotive GmbH, Hannover (DE)

( * ) Notice: Subject to any disclaimer, the term of this patent is extended or adjusted under 35 U.S.C. 154(b) by 351 days.

(21) Appl. No.: 16/051,819

(22) Filed: Aug. 1, 2018

(65) Prior Publication Data
US 2019/0041668 A1     Feb. 7, 2019

(30) Foreign Application Priority Data
Aug. 1, 2017 (DE) .................. 10 2017 213 291.4

(51) Int. Cl.
*G05F 1/12*          (2006.01)
*G02F 1/01*          (2006.01)
(Continued)

(52) U.S. Cl.
CPC .............. *G05F 1/12* (2013.01); *E06B 3/6722* (2013.01); *G02F 1/0123* (2013.01); *H02J 3/00* (2013.01)

(58) Field of Classification Search
CPC ...... G05F 1/12; G05F 1/13; G05F 1/15; E06B 3/6722; E06B 9/24; G02F 1/0123; H02J 3/00; G01R 19/0084
(Continued)

(56) References Cited

U.S. PATENT DOCUMENTS 3,453,517 A * 7/1969 Kennedy ................. H02P 7/295
                                                           318/257
5,241,443 A * 8/1993 Efantis ................... H02H 7/045
                                                           324/509

(Continued)

FOREIGN PATENT DOCUMENTS

DE        102015101956 A1     8/2016

OTHER PUBLICATIONS

Office Action dated Mar. 26, 2018 from corresponding German Patent Application No. 10 2017 213 291.4.

*Primary Examiner* — Yemane Mehari

(57) ABSTRACT

The disclosure relates to a circuit apparatus for controlling a switchable glazing unit. The circuit apparatus has a potential-isolated circuit part configured to generate a periodically alternating drive voltage which has a predetermined first period duration on the glazing unit. The disclosure provides a voltage source, to which the potential-isolated circuit part is connected via a transformer and which is configured to operate the transformer with an AC voltage which has a second period duration shorter than the first period duration, wherein the potential-isolated circuit part is configured to receive the transformed AC voltage from the transformer and, in repeatedly alternating switching phases, to respectively forward only positive half-cycles of the transformed AC voltage to an electrical capacitance of the glazing unit and to forward only negative half-cycles of the transformed AC voltage to an electrical capacitance of the glazing unit by means of a converter device.

15 Claims, 6 Drawing Sheets

(51) Int. Cl.
*E06B 3/67* (2006.01)
*H02J 3/00* (2006.01)

(58) Field of Classification Search
USPC .......................................................... 323/234
See application file for complete search history.

(56) References Cited

U.S. PATENT DOCUMENTS

| | | | |
|---|---|---|---|
| 2008/0204856 A1* | 8/2008 | Malvino | E06B 9/24 |
| | | | 359/296 |
| 2011/0167617 A1* | 7/2011 | Letocart | G02F 1/15 |
| | | | 29/592.1 |
| 2014/0354940 A1 | 12/2014 | Lam et al. | |

* cited by examiner

CIRCUIT APPARATUS FOR CONTROLLING A GLAZING UNIT WHOSE TRANSPARENCY IS SWITCHABLE, AND SWITCHABLE GLAZING ASSEMBLY, MOTOR VEHICLE AND METHOD FOR CONTROLLING A GLAZING UNIT WHOSE TRANSPARENCY IS SWITCHABLE

BRIEF DESCRIPTION OF THE DRAWINGS

Exemplary embodiments are described in the drawings as follows.

DETAILED DESCRIPTION

Figure 1:
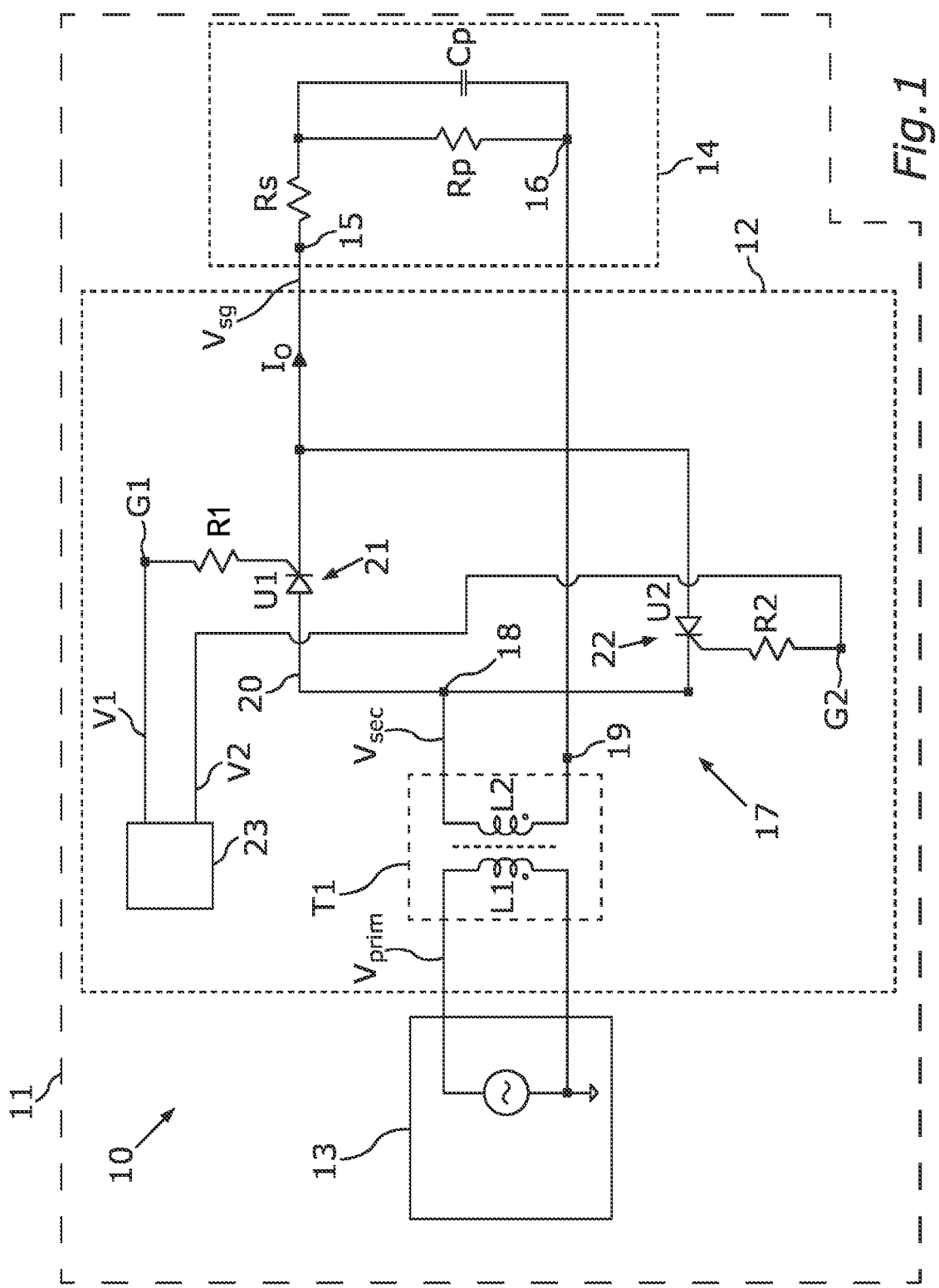
FIG. 1 shows a block diagram of one embodiment of the switchable glazing assembly according to the disclosure.

The disclosure relates to a switching apparatus for controlling a glazing unit whose transparency or turbidity is switchable. Such a switchable glazing unit is also referred to as "smart glass". In order to set a predefined transparency state of the glazing unit, a circuit part generates a periodically alternating drive voltage having a predetermined drive frequency at the glazing unit. The circuit part is potential-isolated. The disclosure also includes a switchable glazing assembly and a motor vehicle having this glazing assembly and a method for controlling a switchable glazing unit.

An electrical switchable glazing unit (smart glass or smart glass panel), for example an SPD (Suspended Particle Device) or PDLC (Polymer Dispersed Liquid Crystal), can be changed over between the "transparent" transparency state and the "darkened/turbid" transparency state by switching an AC voltage on and off. The AC voltage for a switchable glazing unit is referred to as a drive voltage below. The following transparency states are possible in the currently available switchable glazing units which can be driven by means of the drive voltage: a drive voltage of 0 V corresponds to the "darkened" state and a positive or negative drive voltage corresponds to the "transparent/transmissive" state. The periodically alternating drive voltage may be an AC voltage in the range of 60 V-100 V, 50 Hz-100 Hz (PDLC) and 100 V, 50 Hz-100 Hz (SPD). In this case, a switchable glazing unit acts in the circuit as a capacitive load having a capacitance which may have a value of 500 nF/m$^2$. For safety reasons, potential isolation for the drive voltage is required for driving a switchable glazing unit, which can be achieved by means of a potential-isolated circuit part.

For this potential isolation, it is possible to use a transformer which, however, has a relatively large installation volume for the stated frequencies, which makes the provision of a switchable glazing assembly undesirably intensive in terms of installation space, for example in a motor vehicle.

The drive voltage need not be a sinusoidal AC voltage, but rather a pulse-width-modulated square-wave voltage can also be used. Although the pulse-width-modulated variant is advantageous for adapting the drive voltage to an instantaneous characteristic of a switchable glazing unit, an undesirable interference spectrum is produced by the square-wave voltage, which reduces the electromagnetic compatibility (EMC).

The subject matter of the disclosure is based on the object of providing a switchable glazing assembly having a glazing unit whose transparency is switchable, which requires little installation space for the driving circuit apparatus and simultaneously has favourable electromagnetic compatibility.

This object is achieved by the subject matters of the independent patent claims. Advantageous developments of the subject matter of the disclosure are described by the dependent patent claims, the following description and the figures.

One aspect of the disclosure relates to switching electrics for a switchable glazing unit, that is to say said circuit apparatus. In this respect, the subject matter of the disclosure provides a circuit apparatus for controlling a glazing unit whose transparency is switchable. The circuit apparatus has the potential-isolated circuit part which, in order to set a predefined transparency state (for example "transparent" or "darkened"), is set up to generate a periodically alternating drive voltage which has a predetermined first drive frequency and therefore also a predetermined first period duration at the glazing unit. The period duration is generally the inverse value of the frequency.

In order to achieve the potential isolation, a transformer is used in the circuit apparatus according to the disclosure. The subject matter of the disclosure also provides for a voltage source to be provided, to which the potential-isolated circuit part is connected via the transformer, wherein this voltage source is set up to operate the transformer with an AC voltage which has a generator frequency differing from the drive frequency and therefore accordingly also has a second period duration. The second period duration is shorter than the first period duration. In other words, the generator frequency is greater than the drive frequency.

The transformer transforms the AC voltage of the voltage source into a transformed AC voltage which then, however, still has the generator frequency which is greater than the required drive frequency. As explained in more detail below, the circuit apparatus according to the disclosure generates the lower drive frequency therefrom. The potential-isolated circuit part is set up to receive the transformed AC voltage from the transformer and to generate repeatedly alternating switching phases by means of a converter device. It therefore repeatedly alternates a first switching phase with a second switching phase. In the first switching phase, the potential-isolated circuit part forwards only positive half-cycles of the transformed AC voltage to the electrical capacitance of the glazing unit by means of the converter device. In the subsequent, second switching phase, the converter device forwards only negative half-cycles of the transformed AC voltage to the electrical capacitance of the glazing unit. The first switching phase then begins again. In this case, the converter device is controlled by a control device which can have a microcontroller, for example, in order to control the converter device and/or to stipulate the duration of the switching phases. Overall, the duration of two successive switching phases (first switching phase: only positive half-cycles and then second switching phase: only negative half-cycles) corresponds to the first period duration. A period of the drive voltage is therefore composed overall of two switching phases. As a result of the smoothing effect or buffer effect, which results from the capacitance of the glazing unit, the drive voltage is generated overall with a temporal profile having a rectangular basic form. The period duration of the drive voltage can be set by counting the half-cycles in each switching phase.

The subject matter of the disclosure results in the advantage that the transformer can be operated at a generator frequency which can be independent of and, in particular, greater than the drive frequency of the drive voltage for the switchable glazing unit. As a result, selecting an accordingly high generator frequency for transmitting the electrical power needed to operate the switchable glazing unit makes it possible to use a smaller transformer than for the case in which the same power would have to be transmitted at the drive frequency. The drive voltage with the drive frequency (that is to say with the first period duration) is then formed from the transformed AC voltage in the potential-isolated circuit part. The converter device used for this purpose can have controlled switches which can be electrically turned on by the control device whenever a half-cycle of the polarity (first switching phase positive, second switching phase negative) to be currently forwarded is present in the transformed AC voltage. Such a switch is, in particular, a semiconductor switch which can be implemented on the basis of a transistor or a MOSFET (Metal Oxide Semiconductor Field Effect Transistor), for example, or preferably by means of a supply-free component, for example a thyristor. A separate switch of the type mentioned can be provided for each switching phase.

The disclosure includes developments that provide additional advantages.

The drive voltage is preferably free of DC voltage in order to prevent electrochemical decomposition of the active materials and electrodes of the switchable glazing unit. For this purpose, a secondary-side connection of the transformer is permanently connected to a connection of the glazing unit during the switching phases. Only the other secondary-side connection of the transformer is switched in the described manner with respect to the other connection of the switchable glazing unit by means of the converter device. The potential of this other connection with respect to the permanently connected connection therefore sometimes changes according to the positive half-cycles and sometimes changes according to the negative half-cycles. The overall result is a drive voltage which is free of DC voltage if the switching phases last for the same length of time.

The drive frequency can preferably be changed or set in order to adapt it to the instantaneous characteristic or properties of the glazing unit. For this purpose, the control device of the circuit apparatus is set up to set the drive frequency (which indeed corresponds to the first period duration) to a desired value. A dimming effect can also be set hereby as a continuous transition or the setting of an intermediate value for the clarity or turbidity of the glazing unit. This can be carried out in a fine adjustment and in a coarse adjustment. For the fine adjustment, the generator frequency of the voltage source that corresponds to the second period duration is defined or set or varied. The value of the generator frequency can be changed continuously, for example, in a range of values in order to obtain a suitable generator frequency value. Additionally or alternatively, a number of half-cycles for each switching phase can be set in the coarse adjustment. The drive frequency can also be continuously changed for the dimming effect. In this case, the fine adjustment can be carried out first of all and, upon reaching a maximum or minimum value for the generator frequency, it is possible to change over by one or more levels by means of the coarse adjustment and to simultaneously reset the generator frequency. This enables successive sweeps of the generator frequency. An amplitude of the AC voltage of the voltage source can also be varied. The dimming effect can be continuously varied with the amplitude. For the dimming effect, the drive frequency corresponding to the first period duration can therefore be varied by changing a generator frequency of the voltage source that corresponds to the second period duration and/or by changing a number of half-cycles for each switching phase and/or an amplitude of the AC voltage of the voltage source can be changed.

The switchable glazing unit generally does not only have an electrical capacitance, but may also have a leakage resistance. If an electrical voltage is applied, active power losses therefore result and must be compensated for. According to one development, this is achieved by means of a voltage correction. In this case, the control device is set up, by means of the voltage correction, to set an amplitude of the AC voltage of the voltage source on the basis of the active power losses which are produced by the leakage resistor of the switchable glazing unit. As soon as the active power losses are therefore certain or have been detected or measured, the amplitude of the AC voltage is adapted.

In order to determine the active power losses, the control device may be set up to determine a current intensity value of a resulting electrical current in the switchable glazing unit during the forwarding of at least one half-cycle in at least one of the switching phases. If a half-cycle is therefore forwarded, electrical voltage is applied to the switchable glazing unit and a current can flow through the leakage resistor. The current intensity of this current can be determined metrologically, for example on the basis of a shunt resistor. The amplitude of the AC voltage of the voltage source is then determined on the basis of the current intensity value of the current using a predetermined assignment rule. The assignment rule may be a calculation rule, as explained further below, or may be determined on the basis of a test series, for example.

In order to synchronously switch a plurality of switchable glazing units with simple technical effort, one development provides for not only one switchable glazing unit but rather at least one series circuit respectively comprising at least two switchable glazing units and/or at least one parallel circuit respectively comprising at least two switchable glazing units to be connected to the potential-isolated circuit part. More than one switchable glazing unit can thus be synchronously switched using a single control device.

An advantage arises if at least one further potential-isolated circuit part is provided and is set up such that a further switchable glazing unit can be respectively connected to the transformer. This further potential-isolated circuit part can then also be switched by means of the control device. A plurality of potential-isolated circuit parts are therefore supplied via the same transformer, but are switched by means of the same control device. In this case, the control device is set up to switch the converter devices of the different potential-isolated circuit parts in a phase-shifted manner with respect to one another. The potential-isolated circuit parts therefore receive the same transformed AC voltage, which ensures an identical appearance of the switchable glazing units. At the same time, however, the polarity reversal operations between the switching phases take place in a delayed or phase-shifted manner, thus achieving a better load distribution at the voltage source than in the case of a simultaneous change between the switching phases of all converter devices.

The potential-isolated circuit is preferably operated in a resonance method, that is to say a polarity reversal rate between the first switching phase and the second switching phase corresponds to a resonant frequency formed by the capacitance of the switchable glazing unit and an inductance of the transformer. This ensures low-interference operation. This is achieved by setting the generator frequency to the resonant frequency or close to the resonant frequency, which is intended to mean here that it is in a range of the resonant frequency minus 10% of the resonant frequency to the resonant frequency plus 10% of the resonant frequency (resonant frequency±10%).

The advantage of providing a square-wave voltage as the drive voltage is that the transmissivity-determining dipoles of the glazing unit no longer move during the on period of the drive voltage on account of the constant field. However, an ideal signal waveform for the electromagnetic radiation would be the sinusoidal waveform. These two signal waveforms are combined by one development. In order to also set the electromagnetic compatibility to a better value in this case than can be achieved by means of a pure square-wave voltage, one development provides for a profile for the drive voltage which has a trapezoidal basic form, that is to say a gradual transition during the polarity reversal between the switching phases, that is to say no switched transition, to be achieved. The control device is set up to respectively change over between the switching phases when the transformed AC voltage changes between two opposite half-cycles, that is to say from a maximum to a minimum or conversely from a minimum to a maximum. At the transition between the switching phases, the drive voltage then has the profile which results when changing between the minimum and the maximum in the case of the sinusoidal transformed AC voltage. The drive voltage therefore has a profile with plateaus for positive and negative and with sinusoidal edges.

The first period duration which produces the drive frequency for the switchable glazing unit is preferably as long as possible. In other words, the drive frequency is as low as possible, thus maximizing the active power portion. However, if the drive frequency is too low, a flickering effect results. One development therefore provides for the drive frequency corresponding to the first period duration to be greater than a cut-off frequency at which a flickering effect of the switchable glazing unit would result, that is to say the flickering effect would begin, and would likewise be present in the case of an even lower drive frequency. However, the drive frequency is preferably less than 10 times, in particular less than five times, this cut-off frequency.

The disclosure provides, in particular, for the first period duration to correspond to a drive frequency in the range of 20 Hz to 250 Hz and for the second period duration to correspond to a generator frequency in a range of 800 Hz to 3 kHz.

In order to maximize the electromagnetic compatibility of the circuit apparatus, provision is preferably made for the AC voltage for the transformer to have a sinusoidal profile. In other words, the AC voltage has one frequency.

The combination of the described circuit arrangement with at least one switchable glazing unit results in the switchable glazing assembly provided according to the disclosure.

The subject matter of the disclosure is preferably used for a motor vehicle, which is why the subject matter of the disclosure also comprises a motor vehicle having an embodiment of the switchable glazing assembly according to the disclosure.

The disclosure finally also includes a method for controlling a glazing unit whose transparency is switchable by means of a circuit apparatus, wherein the circuit apparatus has the potential-isolated circuit part which, in order to set a predefined transparency state, generates a periodically alternating drive voltage which has a predetermined first period duration (and therefore a predetermined drive frequency) at the glazing unit. A voltage source, to which the potential-isolated circuit part is connected via a transformer, operates the transformer with an AC voltage which has a second period duration shorter than the first period duration. In other words, the generator frequency corresponding to the second period duration is greater than the drive frequency. The potential-isolated circuit part receives the transformed AC voltage from the transformer and, in periodically alternating switching phases, respectively forwards only positive half-cycles (first switching phase) of the transformed AC voltage to the electrical capacitance of the glazing unit and forwards only negative half-cycles (second switching phase) of the transformed AC voltage to the electrical capacitance of the glazing unit by means of a converter device controlled by the control device. The duration of two successive switching phases corresponds overall to the first period duration. In other words, the periodically alternating drive voltage is an AC voltage which is formed on the basis of the switching phases.

The disclosure also includes developments of the method according to the disclosure having features which have already been described in connection with the developments of the circuit apparatus according to the disclosure. For this reason, the corresponding developments of the method according to the disclosure are not described here again.

In the exemplary embodiments, the described components each represent features of the subject matter of the disclosure which are to be considered independently of one another and are also to be considered to be part of the subject matter of the disclosure individually or in a combination other than that shown. The described embodiments can also be supplemented with further features of the features which have already been described.

In the figures, functionally identical elements are in each case provided with the same reference signs.

FIG. 1 shows a switchable glazing assembly 10 which can be installed, for example, in a motor vehicle 11 or in a building. The glazing assembly 10 may have a circuit apparatus 12, a voltage source 13 and at least one switchable glazing unit 14. Each switchable glazing unit 14 may be a so-called smart glass panel. It is therefore also referred to as smart glass or SG 14 below. Of the switchable glazing unit 14, a series resistor Rs and a capacitance Cp and a leakage resistor RP acting in parallel therewith are illustrated in the form of an equivalent circuit diagram. The switchable glazing unit 14 may be an SPD or a PDLC.

In order to set a transparency state of the switchable glazing unit 14, a drive voltage Vsg can be generated or set by the circuit apparatus 12 at connection contacts 15, 16 of the switchable glazing unit 14. The circuit apparatus 12 can generate the drive voltage Vsg on the basis of an AC voltage Vprim of the voltage source 13. For this purpose, the potential-isolated circuit part 17 which generates the drive voltage Vsg is connected to the voltage source 13 in a potential-isolated or DC-isolated manner via a transformer T1. The voltage source 13 can generate the AC voltage Vprim as a sine-wave voltage. The AC voltage Vprim generates an alternating current in a primary-side coil L1, which alternating current induces a transformed AC voltage Vsec in a secondary-side coil L2 between connections 18, 19 of the transformer T1.

The connection 19 of the transformer T1 can be permanently connected to a connection 16 of the switchable glazing unit 14. The connection 18 of the transformer T1 can be connected to the other connection 15 of the switchable glazing unit 14 via a converter device 20, or a converter 20 for short, of the potential-isolated circuit part 17. The converter device 20 may have two switching elements 21, 22 which constitute electrically switchable switches. Each switching element 21, 22 can be formed on the basis of a transistor or a MOSFET or on the basis of a supply-free component, such as a thyristor. The converter device 20 can be operated as an active rectifier.

The switching elements 21, 22 can be switched by a control device 23 which may have a microcontroller, for example, for this purpose. The control device 23 may be connected to a switching connection G1 of the switching element 21 and to a switching connection G2 of the switching element 22. A protective resistor R1, R2 can be respectively provided at the respective switching connection G1, G2.

The switching element 21 can be switched to an electrically conductive state by generating a switching voltage V1 at the connection G1. The switching element 22 can be switched to an electrically conductive state by generating a switching voltage V2 at the connection G2. A drive current IO is produced in the switchable glazing unit 14 by the drive voltage Vsg.

Figure 2:
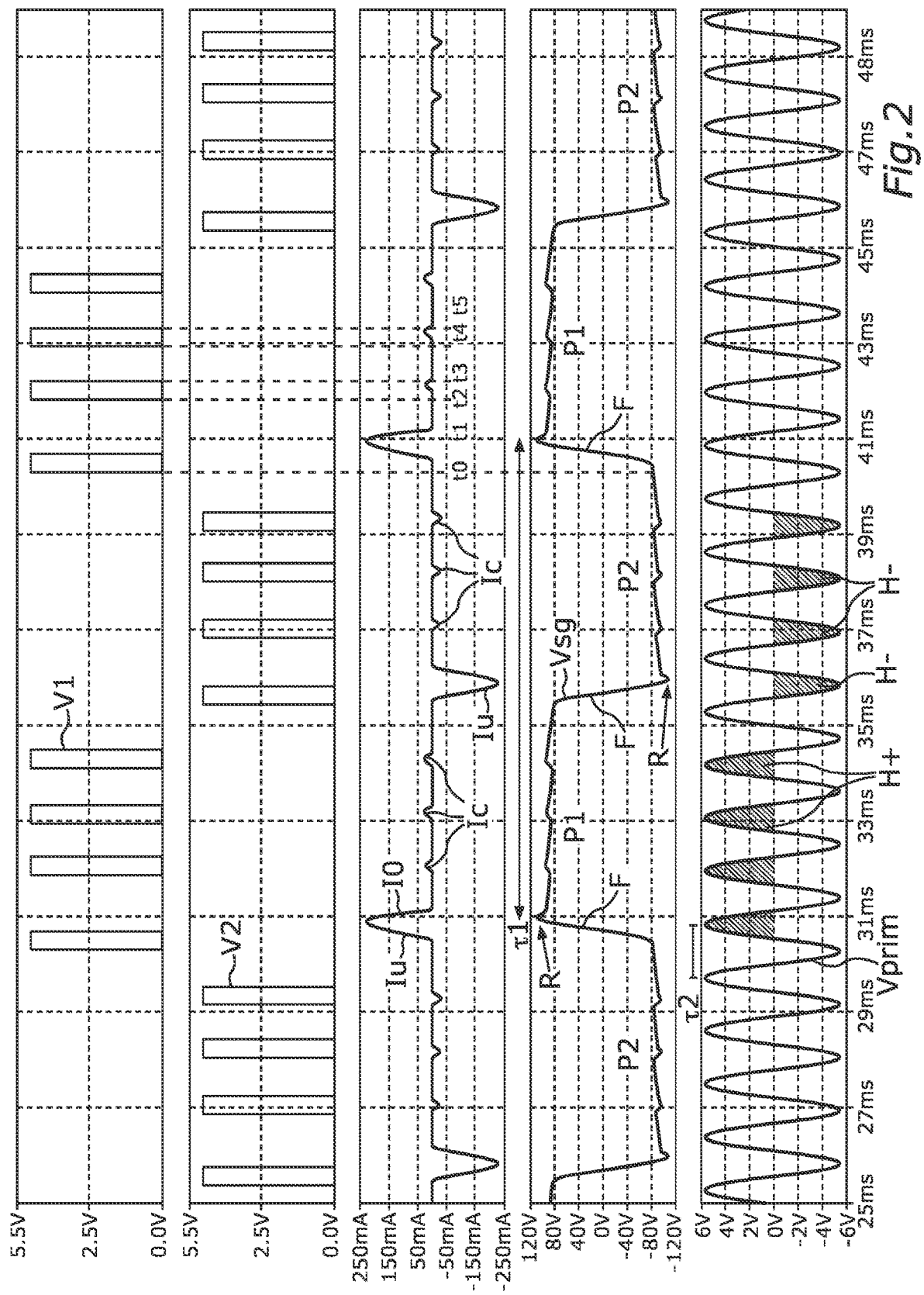
FIG. 2 shows graphs with schematic profiles of electrical variables of the glazing assembly from FIG. 1.

FIG. 2 illustrates said electrical variables. A first switching phase P1 and a second switching phase P2 alternately follow one another. In the respective first switching phase P1, only positive half-cycles H+ of the transformed AC voltage Vsec are forwarded to the connections 15, 16 of the switchable glazing unit 14 and, in the second switching phase P2, only negative half-cycles H− of the transformed AC voltage Vsec are forwarded to the connections 15, 16 of the switchable glazing unit 14. This is carried out by means of corresponding switching pulses of the switching voltages V1, V2, as a result of which the respective switching element 21, 22 is respectively electrically turned on in order to let through the respective half-cycle H+, H−. On account of the leakage resistor Rp, a compensation current Ic results after each polarity reversal, a compensation current Iu during the respective switching phase P1, P2 with each forwarded half-cycle. The period duration τ1 of the drive voltage Vsg and the period duration τ2 of the AC voltage Vprim are also illustrated. The drive frequency corresponds to 1/τ1 and the generator frequency corresponds to 1/τ2.

For safety reasons, potential isolation (floating) is provided for the drive voltage (contact voltage) in order to drive the smart glass panels or switchable glazing unit. With regard to the optical properties, the AC voltage for the driving is ideally a square-wave voltage since the transmissivity-determining dipoles no longer move during the on period of the drive voltage on account of the constant field. However, with regard to the electromagnetic radiation, the ideal signal waveform is sinusoidal. This is combined by means of a trapezoidal profile of the drive voltage Vsg.

Provision is also made for the AC voltage to be free of DC voltage in order to prevent electrochemical decomposition of the active materials and electrodes. Dimming of the smart glass is generally additionally required, that is to say a continuous transition between the "darkened" state and the "transmissive" state. The dimming can be controlled by means of pulse width modulation (PWM) of the drive voltage or by means of the amplitude of the voltage. The transmissivity of the glass is therefore set using the voltage effectively applied to the smart glass.

The drive voltage Vsg with a low frequency, for example 25 Hz-200 Hz, for smart glass is generated from a DC-free low-voltage AC generator (voltage source 13). This AC generator has a generator frequency which is considerably above the standard frequency of 50 Hz/60 Hz, for example 900 Hz to 2 kHz. This AC generator feeds into a step-up transformer T1. The physical dimensions of the transformer T1 are considerably reduced by using a higher operating frequency and, as a result, it is possible to integrate the transformer T1 in the electronics. It is known that the core selection criterion for the transformer dimensions is the window area product. The following applies to a sinusoidal voltage:

$$Wa \cdot Ac = Aw \cdot Vp/(4.4 \cdot Bm \cdot Kw \cdot f)$$

where
Wa is the required window area through which all windings must fit
Ac is the required core area
Aw is the wire area
Vp is the primary applied voltage
Bm is the magnetic flux density in the core
Kw is the winding factor in the transformer window
f is the operating frequency of the transformer If the values Aw, Vp, Bm, Kw are assumed to be constant for a transformer, $Wa \cdot Ac$ is proportional to the voltage divided by the operating frequency=$K \cdot Vp/f$ or is a measure of the voltage-time product. 900 Hz are 18 times higher than 50 Hz and the dimensions of the required transformer are therefore considerably smaller.

The output voltage is alternately generated as AC on the secondary side of the transformer T1 using controlled switching elements 21, 22, for example transistors or MOSFETs, or more simply using supply-free components such as thyristors.

FIG. 2 shows the potential-isolated driving of a capacitive load according to the following method:

At the time t0, a thyristor U1, for example, as a switching element 21 is driven by means of a pulse (see V1). The transformer secondary circuit L2 having the smart glass (SG) capacitance Cp is excited and, in a resonance method, the load capacitance Cp reverses the charge of the SG 14. Since the thyristor U1 conducts the current IO only in one direction, the charge reversal current is ended at the time t1. The charge of the output voltage Vsg at the capacitive load Cp is reversed to a positive voltage value in a low-interference manner by the resonance method. Depending on the Q factor of the resonant circuit, the maximum output voltage Vsg may be higher than the secondary voltage amplitude of Vsec. This can be seen in FIG. 2 from the fact that, with each voltage polarity reversal, a resonance overshoot R is produced in the drive voltage Vsg with the first half-cycle H+, H− and is no longer present in the same switching phase P1, P2 during recharging by means of the subsequent half-cycles H+, H−. This facilitates the dimensioning of the transformer T1 for a predetermined loss factor. The active power losses in the SG 14 are mainly caused by the resistor Rp in the equivalent circuit diagram of the SG 14. The active power losses in Rp cause a voltage reduction in the time range t1 to t2, for example. Next triggering of the thyristor U1, for example at the times t2 and t4, ensures a voltage correction until t3 and t5, and the output voltage Vsg therefore respectably rises to the secondary voltage amplitude of the transformed AC voltage Vsec.

The measurement of the energy required for this voltage correction is a measure of the SG active power losses and can be used to correct the root mean square value of the output voltage and for a load diagnosis. This measurement can also be carried out on the primary side of the transformer T1 or at the low-voltage AC generator 13. This results in a considerable simplification of the system, in particular as a result of the potential-isolated voltage measurement which is otherwise required being dispensed with.

The thyristors U1, U2 are likewise preferably driven in a potential-isolated manner, for example by means of thyristor triggering transformers. After an uneven number of primary voltage half-cycles H+, H−, the polarity of the output voltage is reversed F (edge). The entire method is then periodically repeated. Controlling the primary voltage amplitude Vprim makes it possible to control the root mean square value of the output voltage. Selecting the frequencies of the generator voltage Vprim and the number of half-cycles H+, H− before the polarity of the voltage is reversed makes it possible to generate a DC-free output voltage with any desired output frequency at the load. The polarity of the voltage is always reversed F in the resonance method and therefore in a low-interference manner. The generated trapezoidal signal having the sinusoidal edges has little interference and has higher root mean square values than a sinusoidal signal of the same amplitude (see FIG. 2). The choice of a lower output frequency with fast and low-interference sinusoidal voltage polarity reversal operations F has a positive effect on the optical properties of the SG 14. At the same time, the losses in the system are reduced. These losses are reduced, on the one hand, by reducing the displacement currents in the capacitance Cp of the SG 14 and the associated active power losses in the SG 14. On the other hand, this is achieved by reducing the transformer losses on the basis of the small harmonic component of the current through the transformer.

The drive voltage for the smart glass 14 is preferably free of DC voltage.

The output frequency for the smart glass 14 is preferably finely adjustable by selecting the frequencies of the generator and coarsely adjustable by means of the number of half-cycles before the voltage polarity reversal F of the AC voltage generator, that is to say the converter device 20.

The advantage based on the use of a generator to drive the isolating transformer at a considerably higher frequency than the standard low frequency is that the dimensions of the isolating transformer can be reduced and it is therefore possible to integrate the transformer in the control module, that is to say to solder it onto a circuit board, for example.

A small transformer means lower costs of the transformer core and turns. The drive voltage for the smart glass 14 can assume different output voltages and frequencies depending on the low-voltage generator amplitude and frequency in order to control the transparency of the SG in an arbitrary manner. The converter (that is to say the converter device 20) generates an output voltage with rounded edges (see FIG. 2 and FIG. 4). As a result, the harmonic content of the output voltage is low and the signal is generated without any complicated filter components. The elimination of the output filter reduces the module costs and installation spaces. The generation of the output voltage Vsg with rounded edges and a constant duration for the voltage polarity reversal F improves the visible optical properties of the SG 14 and the EMC (electromagnetic compatibility) at the same time. On account of its high efficiency, the converter is also suitable for higher powers, that is to say for driving larger smart glass panels or a plurality of smart glass panels 14. The converter 20 requires only a small number of small-volume components. Therefore, the converter 17 is well suited to integration in a smart glass panel since it is possible to dispense with a heat sink. The voltage generator 13 on the primary side of the isolating transformer T1 is constructed using low-voltage technology and can also be used without any problems in automotive applications with restricted installation space. Standard high-voltage components can be used on the secondary side of the isolating transformer T1. If thyristors U1, U2 which are known for their high robustness are used, no additional auxiliary supplies are required. Another advantage of using thyristors is that the polarity is automatically reversed F at the current zero crossing and there is no need for any further complicated monitoring and control for switching elements 21, 22. The complexity and the costs are reduced as a result of the elimination of additional auxiliary supplies on the secondary side, for which potential isolation would be required for safety reasons. The converter 20 regularly recharges the SG losses. The measurement of the energy needed to compensate for the losses takes place on the low-voltage side and can be used for control and diagnosis without any additional potential isolation. A more expensive and complicated electronic unit is avoided thereby.

The converter 20 can be used to generate drive signals Vsg which are free of DC voltage for smart glass panels from any desired AC voltage systems. The isolating transformer T1 automatically ensures an output voltage Vsec which is free of DC voltage. Optimal transformer use is effected on the basis of temporally symmetrical trigger signals for the low-frequency polarity reversal operations F. The advantage is a simple and intrinsically safe system.

The converter 20 can also be used to generate a drive signal which is free of DC voltage for smart glass panels (see FIG. 2) with an adjustable voltage and frequency from a single-phase AC voltage system. In contrast to standard low-frequency solutions, the generation of a low-frequency voltage Vsg adapted to the SG 14 means that the SG will remain flicker-free and the contrast ratio of the SG is increased at the same time.

This advantage is achieved by the voltage polarity reversal time constancy, even for the case of low frequencies. The selection of a low frequency reduces the losses in the system on account of the reduced heating. Less heating in the control module means small dimensions and low costs.

Figure 3:
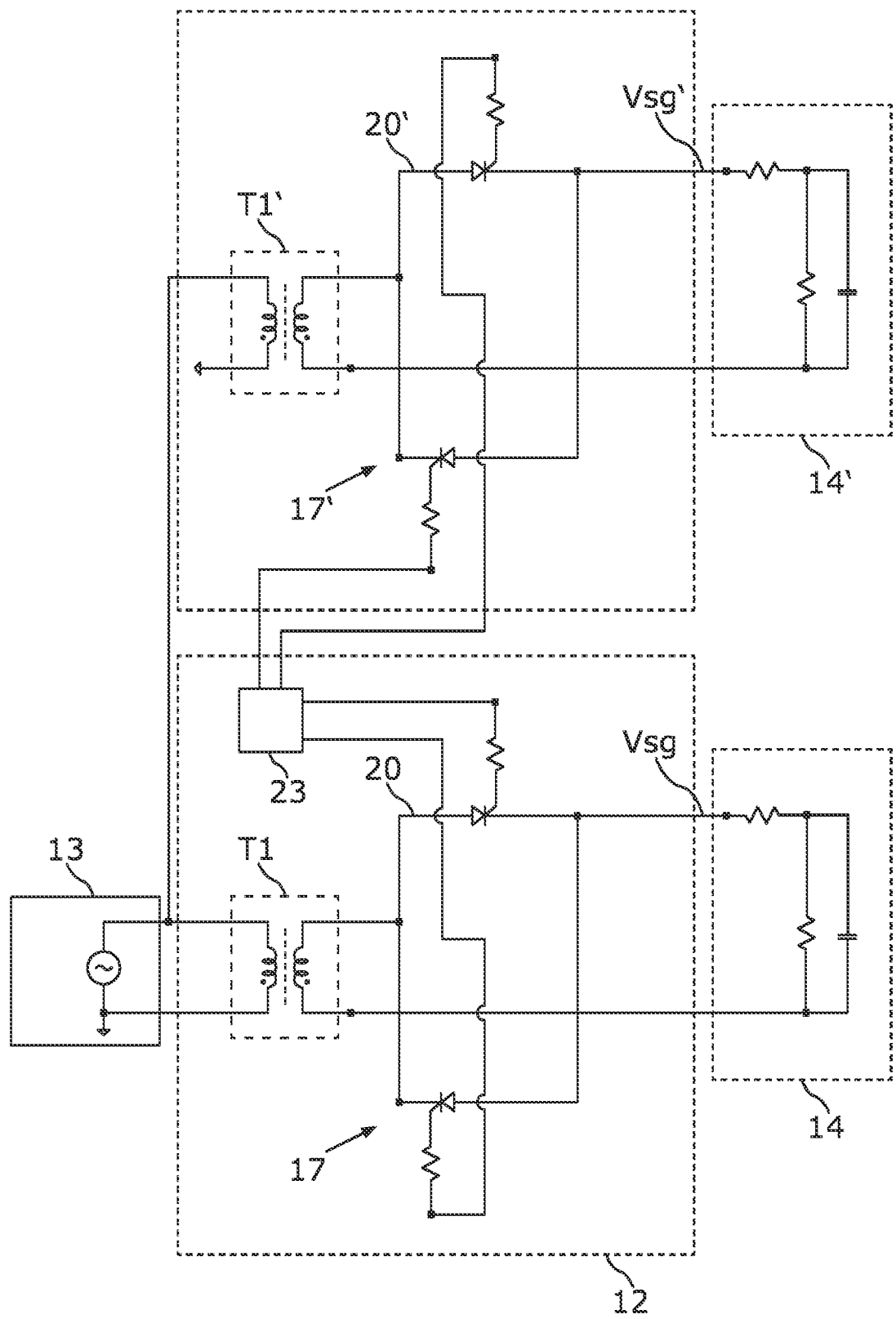
FIG. 3 shows a block diagram of an alternative embodiment of the glazing assembly according to the disclosure.

FIG. 3 illustrates an embodiment in which the circuit apparatus has a plurality of potential-isolated circuit parts 10, 10' which are each connected to the voltage source 13 via a separate transformer T1, T1'. The circuit device 22 can switch the respective converter device 20, 20' of the individual potential-isolated circuit parts 17 17' in a phase-shifted manner with respect to one another.

One or more smart glass modules, that is to say one or more SG panels, are supplied from an AC voltage generator. The "darkened" or "transmissive" state can be individually selected for each panel. However, the permitted degree of transmissivity in the transmissive state is predefined by the amplitude of Vprim and is the same for all modules connected in parallel. This can be advantageous, for example in building systems, in order to save cooling energy on hot and sunny days. For better current distribution in the low-voltage generator, it is advantageous if the polarity of the high voltage is reversed with a phase shift.

The converter 20 can be used to generate a drive signals which is free of DC voltage for smart glass panels from a multi-phase AC voltage system (see FIG. 3). In a system having a plurality of SG modules 14 which are supplied by a low-voltage AC converter 13 via a separate transformer T1, T1' in each case, the "fully darkened" or "transmissive" state can be individually selected for each panel. However, the permitted degree of transmissivity in the transmissive state is predefined by the amplitude of Vprim and is the same for all modules connected in parallel. This can be advantageous, for example in large systems, in order to save cooling energy of the air-conditioning system on hot and sunny days.

Figure 4:
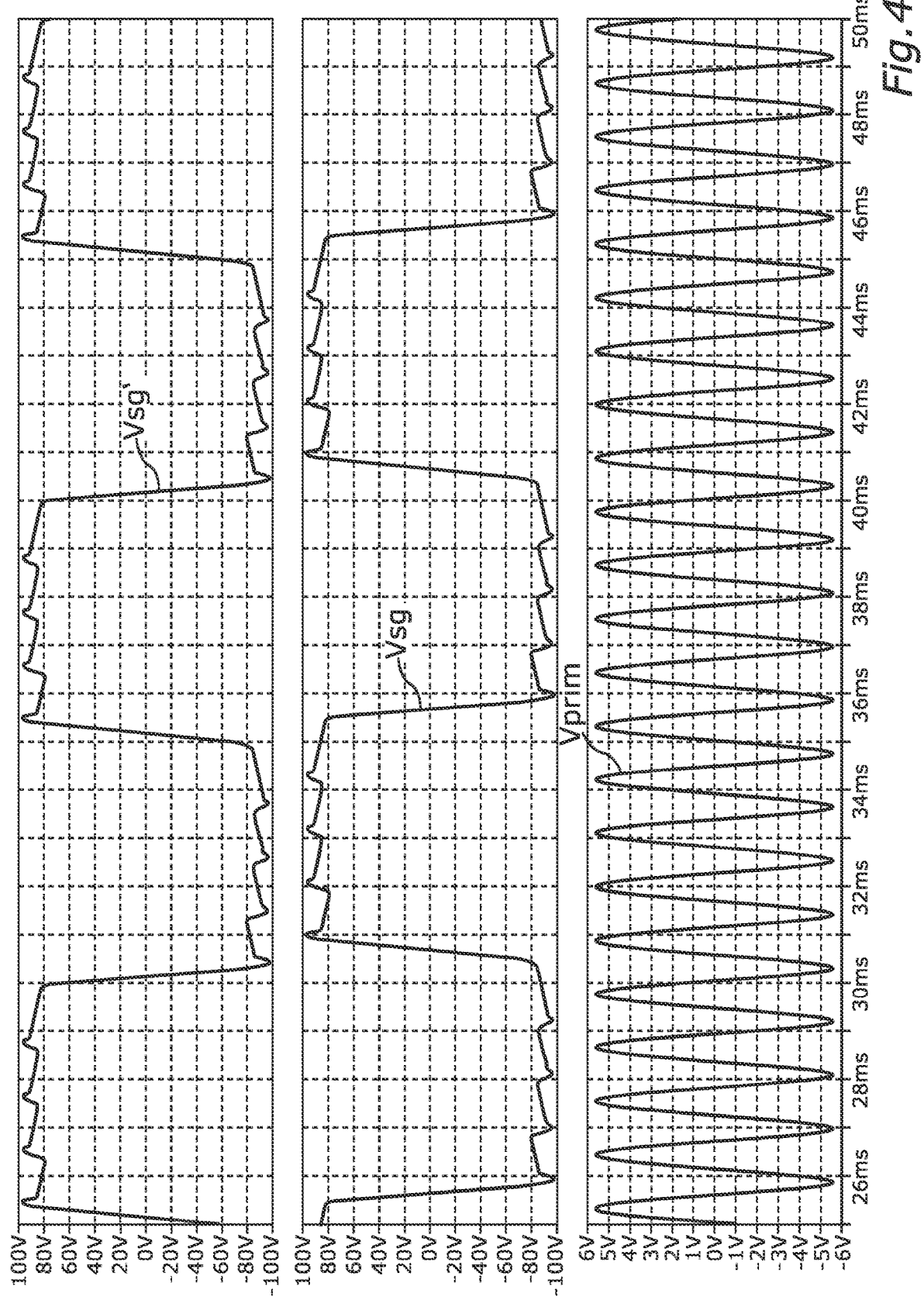
FIG. 4 shows graphs with electrical variables of the glazing assembly from FIG. 3.

In this respect, FIG. 4 illustrates the phase-shifted temporal profiles for the two resulting drive voltages Vsg, Vsg'.

Figure 5:
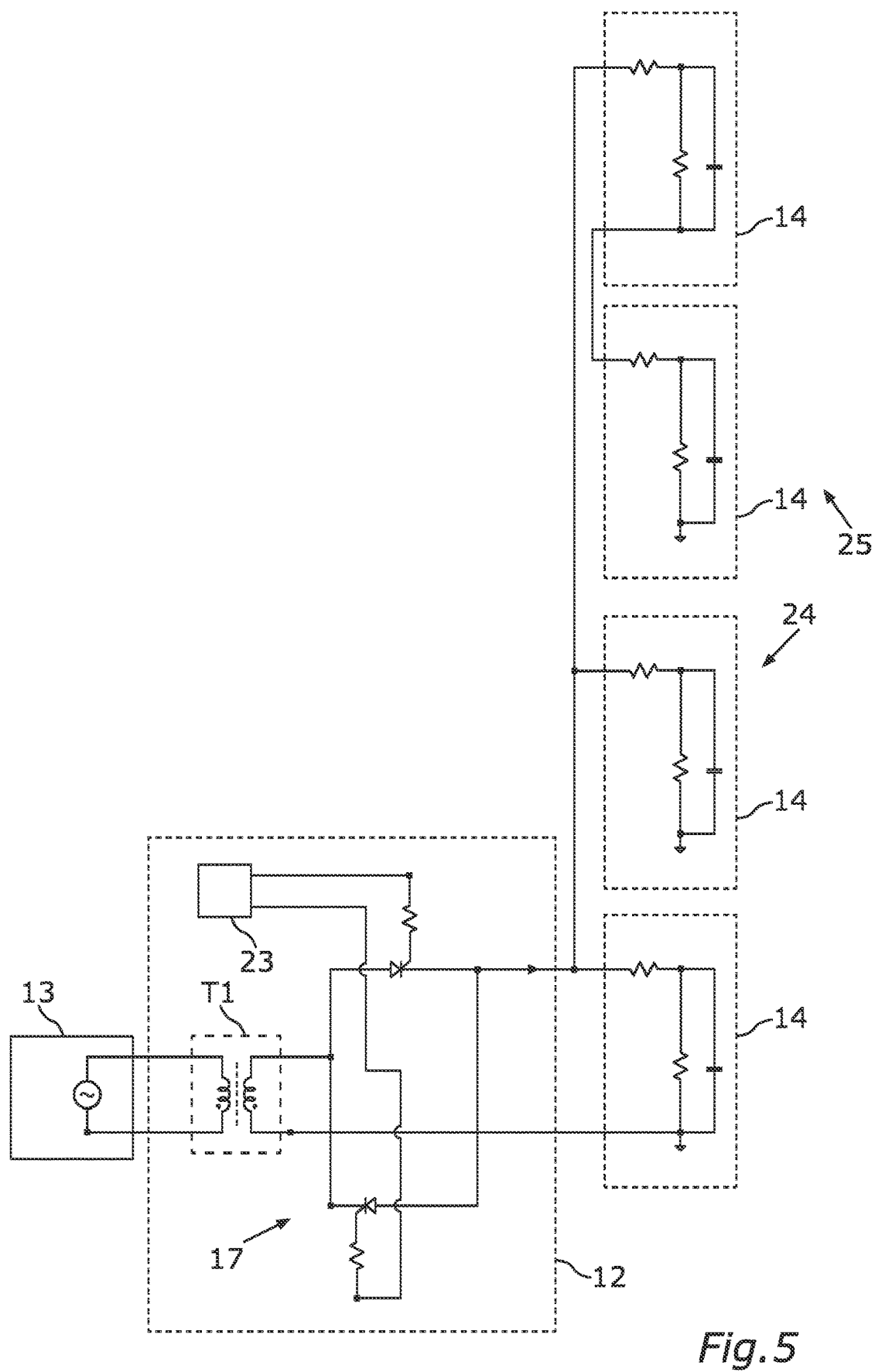
FIG. 5 shows a block diagram of a further embodiment of the glazing assembly according to the disclosure.

FIG. 5 illustrates an embodiment in which a plurality of switchable glazing units 14 are connected to the circuit apparatus 12 at the same potential-isolated circuit part 17. A parallel circuit 24 and/or a series circuit 25 respectively comprising at least two switchable glazing units 14 can be provided. A plurality of SG panels 14 connected in parallel, in series or in another combination are supplied from the one converter 20.

The integration of the potential isolation in the converter module (see FIG. 5) is advantageous, in particular in the case of an all-in-one device solution. This embodiment which is particularly suitable for driving individual smart glass panels comprises a converter for generating the AC voltage from the supply network (DC-AC converter) and the converter with a potential isolator, for example a transformer T. The SG panels can be connected to a converter in parallel or in series in order to reduce the number of converters.

Figure 6:
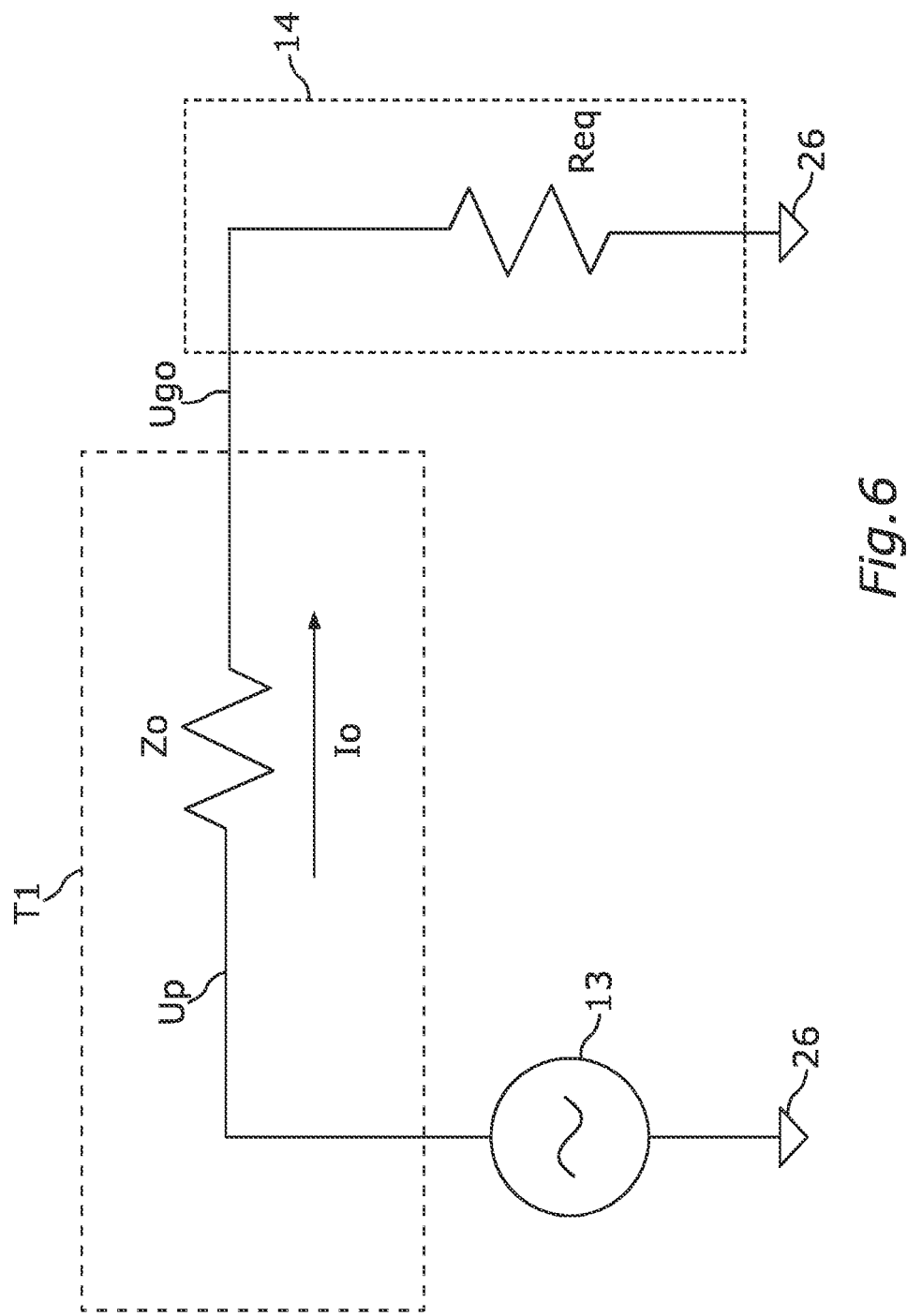
FIG. 6 shows an equivalent circuit diagram for illustrating a voltage correction, as can be carried out by means of an embodiment of the circuit apparatus according to the disclosure.

FIG. 6 shows an equivalent circuit diagram representing the voltage source 13, the transformer T1 and the switchable glazing unit 14 from the embodiment from FIG. 1. The controlled AC voltage with the amplitude Up from the voltage source 13 is applied to the transformer T1 which can have an output impedance Z0 on the output side. The output voltage of the transformer may have an amplitude Ugo. The switchable glazing unit 14 is represented by its leakage resistor, here Req. The potential isolation is not taken into account, which is why a common ground potential 26 is assumed in the circuit.

The output capacitance can therefore be regularly recharged (voltage correction) in order to compensate for the active power losses. The measurement of the energy needed for the voltage correction is a measure of the SG losses. The measured recharging energy is used to correct the root mean square value of the output voltage and for the SG diagnosis (measurement of wear, temperature measurement). FIG. 6 shows the recharging operation for compensating for the Rp losses which are represented by Req in the equivalent circuit diagram. In the ideal case, if the Sg leakage resistance Req is very large, the recharging Ic during the voltage correction pulses is very small or zero. In this case, the output voltage is stored in the SG capacitance Cp. Ugo is the theoretical transformer output voltage $Ugo = Up \cdot ü$ Up is the controlled output amplitude of the generator 13
ü is the isolating transformer transformation ratio On account of the voltage drop across the transformer output impedance Zo, the voltage at the SG 14 falls with the current increase of Io. The transformer output impedance Zo is known and can therefore be considered to be a constant in this application. The current Io can be measured during operation during the recharging operation, for example by means of a primary-side shunt resistor or a current transformer. The necessary voltage correction on the secondary side is $\Delta Vsg = Zo \cdot Io$ and is added to the desired control value Up_soll of Up as a $\Delta Vsg/ü$ correction. Up_soll: desired value seen on the primary side.

It is therefore possible to compensate for the transformer output impedance Zo and the voltage ripple at the SG 14 (see FIG. 2 and FIG. 4). The output voltage Vsg shows a short transient transition until the output current Ic of the recharging operation has been measured and integrated.

The polarity of the voltage is preferably always reversed F using the resonance method and therefore in a low-interference manner.

The trapezoidal signal for the SG driving Vsg with sinusoidal edges has little interference and additionally has a higher root mean square value than a sinusoidal signal of the same amplitude. The described signal waveform ensures flicker-free optics of the SG, in particular even at low drive frequencies. The generation of larger root mean square values for a low signal source amplitude is particularly important in applications in which undervoltages can occur, for example in the automotive sector during the start pulses when the battery voltage has fallen greatly. The AC voltage V_prim can be directly generated with the battery supply on the primary side and the signal is then delivered to the SG via the transformer transformation ratio. The increase in the root mean square value in a range of 15% to 25% on account of the described resonance makes it possible to ensure flicker-free SG transparency during the start pulse without overdimensioning being required for this case. Without this increase in the root mean square value, the transformer would have to have a higher transformation ratio for the same functionality. This would mean a higher price, higher losses and possibly a larger core for the transformer.

It is known that the active power losses in an SG are greatly dependent on the temperature; the leakage resistance Rp, in particular, varies greatly, for example from 2 kΩ to 300 kΩ. Since the output impedance of the converter 20 and of the isolating transformer T1 cannot be zero, the output voltage is dependent on the load without additional measures. Since the degree of transmissivity of the SG is dependent on the root mean square value of the output voltage, the output voltage Vsg must be controlled. For example by means of short triggering operations of the thyristor by means of V1, V2 in sync with the Vprim generator frequency, as illustrated in FIG. 2. After each voltage polarity reversal F, a voltage correction of the output voltage is carried out. Apart from a ripple, the amplitude is kept constant in each switching phase P1, P2 because the generator frequency Vprim is considerably higher than the frequency of the output voltage Vsg for the SG 14. In this case, the converter 20 is structurally simple and efficient.

The influence of output ripple and the converter output impedance on the output voltage Vsg on account of changes in the leakage resistance over temperature or time or aging is reduced with the aid of the measured required amount of energy in the post-triggering cycles for Ic. The measurement and correction take place on the primary side and simplify the structure of the device without secondary-side electronics or auxiliary supplies. At the same time, the calculated voltage correction parameter is an aging indicator of the SG 14 for particular SG reference temperatures and is useful for a diagnosis. The leakage current can rise quickly at higher temperatures, which results in additional heating. It is therefore useful to introduce an output voltage limitation for these cases in order to reduce the aging process of the SG. This brings advantages for the users and the system and is a feature of quality.

On account of the resonant circuit at the converter output, the charge reversal and recharging currents at the SG do not have a sudden change and therefore improve the EMC compatibility. The leakage inductance of the isolating transformer is part of this resonant circuit and is used positively as a result. The active power losses in the transformer itself determine the Q factor Q of the resonant circuit and are used for attenuation. The Q factor Q is preferably set to a value in a range between 0.5 and 1.

It is known that most of the losses for each SG AC supply occur during the AC polarity reversal operations F. These polarity reversal losses increase in proportion to the output frequency, and two polarity reversal operations are also required for each period. A lower output frequency with trapezoidal signals and sinusoidal edges reduces the number and the root mean square value of the displacement currents in the capacitance of the SG without a flickering effect. The polarity reversal current profile remains constant for a short time since it is determined by the much higher resonant frequency. A low output frequency means a reduction in the polarity reversal cycles and therefore low losses in the system. This again makes it possible to optimize the price, installation space and losses.

Overall, the example shows how the subject matter of the disclosure can be used to provide a smart glass control device for fast energy transfer and a low drive frequency.

The invention claimed is:

1. A circuit apparatus for controlling a glazing unit whose transparency is switchable, the circuit apparatus comprising:
   a potential-isolated circuit part which, in order to set a predefined transparency state on the glazing unit, is configured to generate a periodically alternating drive voltage with a predetermined first period duration, wherein a voltage source is provided, to which the potential-isolated circuit part is connected via a transformer and configured to operate the transformer with an AC voltage, the AC voltage having a second period duration shorter than the first period duration, wherein the potential-isolated circuit part is configured to receive a transformed AC voltage from the transformer and, in repeatedly alternating switching phases, to respectively forward only positive half-cycles of the transformed AC voltage to an electrical capacitance of the glazing unit in the first switching phase and to forward only negative half-cycles of the transformed AC voltage to the electrical capacitance of the glazing unit in the subsequent, second switching phase utilizing a converter device controlled by a control device, wherein a duration of two successive switching phases corresponds to the first period duration.

2. The circuit apparatus as claimed in claim 1, wherein the drive voltage is free of DC voltage and a connection of the transformer is permanently connected to a connection of the glazing unit during the switching phases.

3. The circuit apparatus as claimed in claim 1, wherein the control device is configured to vary a drive frequency corresponding to the first period duration by at least one of changing a generator frequency of the voltage source that corresponds to the second period duration, changing a number of half-cycles for each switching phase, and changing an amplitude of the AC voltage of the voltage source.

4. The circuit apparatus as claimed in claim 1, wherein the control device is configured, utilizing a voltage correction, to set an amplitude of the AC voltage of the voltage source on the basis of active power losses which are produced by a leakage resistor of the glazing unit.

5. The circuit apparatus as claimed in claim 4, wherein, to determine the active power losses, the control device is configured to determine a current intensity value of a resulting electrical current during the forwarding of at least one half-cycle and to set the amplitude on the basis of the current intensity value by means of a predetermined assignment rule.

6. The circuit apparatus as claimed in claim 1, wherein at least one of a series circuit comprising at least two switchable glazing units and a parallel circuit comprising at least two switchable glazing units is connected to the potential-isolated circuit part.

7. The circuit apparatus as claimed in claim 1, wherein at least one further potential-isolated circuit part is connected to the transformer for the purpose of respectively connecting a further switchable glazing unit, and the control device is configured to switch the switching phases of the converter device and the switching phases of a respective further converter device of the at least one further potential-isolated circuit part in a phase-shifted manner.

8. The circuit apparatus as claimed in claim 1, wherein a polarity reversal rate between the first switching phase and the second switching phase corresponds to a resonant frequency formed by the capacitance of the switchable glazing unit and an inductance of the transformer.

9. The circuit apparatus as claimed in claim 1, wherein the control device is configured to respectively change over between the switching phases when the transformed AC voltage changes between two opposite half-cycles, with the result that the drive voltage has a profile with sinusoidal edges.

10. The circuit apparatus as claimed in claim 9, wherein a drive frequency corresponding to the first period duration is greater than a cut-off frequency at which a flickering effect of the switchable glazing unit would result, but is less than 10 times the cut-off frequency.

11. The circuit apparatus as claimed in claim 1, wherein the first period duration corresponds to a drive frequency in the range of 20 Hz to 250 Hz and the second period duration corresponds to a generator frequency in a range of 800 Hz to 3 kHz.

12. The circuit apparatus as claimed in claim 1, wherein the AC voltage has a sinusoidal profile.

13. A switchable glazing assembly comprising:
    at least one switchable glazing unit, and
    the circuit apparatus as claimed in claim 1.

14. A motor vehicle comprising the switchable glazing assembly as claimed in claim 13.

15. A method for controlling a glazing unit whose transparency is switchable utilizing a circuit apparatus, wherein the circuit apparatus has a potential-isolated circuit part which, the method comprising:
    to set a predefined transparency state on the glazing unit, at the circuit apparatus, generating a periodically alternating drive voltage which has a predetermined first period duration;
    at a voltage source, to which the potential-isolated circuit part is connected via a transformer, operating the transformer with an AC voltage which has a second period duration shorter than the first period duration;
    at the potential-isolated circuit part receiving a transformed AC voltage from the transformer and, in periodically alternating switching phases, respectively forwarding only positive half-cycles of the transformed AC voltage to an electrical capacitance of the glazing unit and forwarding only negative half-cycles of the transformed AC voltage to an electrical capacitance of the glazing unit utilizing a converter device controlled by a control device, wherein a duration of two successive switching phases corresponds to the first period duration.

\* \* \* \* \*